United States Patent
Yamada et al.

(10) Patent No.: US 6,259,432 B1
(45) Date of Patent: Jul. 10, 2001

(54) INFORMATION PROCESSING APPARATUS FOR IMPROVED INTUITIVE SCROLLING UTILIZING AN ENHANCED CURSOR

(75) Inventors: Saturo Yamada, Sagamihara; Kazuo Tsuchiya, Tokyo-to; Naotaka Kato, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/119,299

(22) Filed: Jul. 20, 1998

(30) Foreign Application Priority Data

Nov. 8, 1997 (JP) .................................................... 9-216198

(51) Int. Cl.$^7$ ...................................................... G09G 5/34
(52) U.S. Cl. ........................... 345/159; 345/123; 345/145
(58) Field of Search ..................................... 345/123, 159, 345/348; 340/995; 395/610, 145

(56) References Cited

U.S. PATENT DOCUMENTS

| | | | |
|---|---|---|---|
| 5,528,260 | * | 6/1996 | Kent ...................................... 345/123 |
| 5,734,891 | * | 3/1998 | Saigh ..................................... 395/610 |
| 6,016,110 | * | 1/2000 | Takinami ............................... 340/995 |

OTHER PUBLICATIONS

Moseley, Lonnie E.; Boodey, David M.; Microsoft Office 97 Professional Edition, pp. 120–121, Jan. 1996.*

* cited by examiner

Primary Examiner—Steven Saras
Assistant Examiner—Srilakshmi Kumar
(74) Attorney, Agent, or Firm—Gregory M. Doudnikoff

(57) ABSTRACT

An information processing apparatus that can adjust the scrolling speed for data displayed in an application window on a display and display a visual scrolling speed indicator. When the user manipulates a mouse to request scrolling of data in a window, the display form of the mouse cursor is changed. That is, in addition to the mouse cursor, one or more speed indicators appears in the scrolling direction. The number of speed indicators which are displayed corresponds to the scrolling speed. The speed indicators are arranged from the center of the mouse cursor in the scrolling direction. A speed indicator is shaped like a small isosceles triangle, and as its vertex is facing in the scrolling direction, it is a very effective visual aid for a user. Preferably, one speed indicator is displayed for a low scrolling speed, two for a moderate scrolling speed and three for a high speed scrolling. Since the speed indicators are extended in the scrolling direction in accordance with the current scrolling speed, a user can intuitively and quantitatively comprehend the scrolling speed and direction. Since the speed indicator is displayed in the vicinity of the mouse cursor, a user does not need to remove his or her eyes from a focus point on the display screen and the continuity of the operation can be maintained.

8 Claims, 6 Drawing Sheets

(a)  (b)

INFORMATION PROCESSING APPARATUS FOR IMPROVED INTUITIVE SCROLLING UTILIZING AN ENHANCED CURSOR

BACKGROUND OF THE INVENTION

1. Field of the Invention

The present invention relates to an information processing apparatus that permits data entry using a pointing device, such as a mouse, under a GUI (Graphical User Interface) environment, and in particular to an information processing apparatus that can adjust the scrolling speed for data displayed in a work window of a display. More specifically, the present invention pertains to an information processing apparatus that can adjust the scrolling speed for data displayed in a work window using a pointing device, and that can visually provide a scrolling speed.

2. Description of the Related Art

In accordance with recent technological developments, various types of personal computers (PCS), such as desktops, towers and notebooks, are being produced and marketed. Because of the enhancement of the processing capabilities of CPUs (Central Processing Units) and the improvement of video sub-systems, it has become common for current PCS to include a bit map display function, i.e., a function for the drawing of individual pixels on a display. In such a hardware environment, the operating system (OS) usually can support a bit mapped display and can provide multiple windows.

The latest OSs, such as "OS/2" from IBM Corp. ("OS/2" is a trademark of IBM Corp.) and "Windows95" from Microsoft Corp.(Windows is a trademark of Microsoft Corp.), have graphical user interfaces (GUIs). A computer system that provides a GUI environment generally permits the installation of an input device (pointing device), such as a mouse, a track ball, a touch pad, a TrackPoint or a joystick, that can be used to designate coordinates. With the pointing device, a user can operate a computer system as though he or she were issuing instructions directly to the screen.

A pointing device has two basic functions: one is the two-dimensional moving of a cursor (mouse cursor) on a display screen, and the other is a clicking function used for one type of selection operation. The user can move a mouse cursor to a specific location (to an object) on a display screen, and then clicks on an object at that location to select its associated function.

Present on a display screen under a GUI environment, i.e., on a "desktop," are many object symbols, such as icons and folders. A user can move a cursor on the desktop to a desired icon or folder by using a pointing device, such as a mouse, and can select an object symbol at the current location of the cursor by depressing (clicking) a mouse button. When, for example, an icon associated with a specific application is selected, the application is activated. Or when a folder is selected, it is opened on the desktop. Further, when a cursor is moved from a specific object symbol to another while the mouse button is held down, and the mouse button is thereafter released, i.e., when a "drag and drop" operation is performed, the moving/copying or erasure of the object symbol can be performed. In other words, under a GUI environment, a user can easily and directly enter his or her desired data merely by intuitively operating the mouse cursor while watching the screen. That is, since the user can perform almost all computer operations merely by manipulating the mouse, he or she is required neither to remember many OS commands nor to study the operation of a keyboard, as is required when using a conventional CUI (Character User Interface) environment.

Generally, only a part of a target file (a document or an image) appears in an application window displayed on the desktop due to the size of the document or image relative to the window. With regard to long word processing documents, for example, only one part of the document text appears in the window. The operation by which data within the corresponding window is moved vertically or horizontally, i.e., the scrolling operation, is conventionally performed in response to a depression or the continuing depression of one of the cursor keys on a keyboard that instructs a desired displacement.

Under a windowing environment, the data displayed within a window can be scrolled by manipulating a scroll bar. Ordinarily, scroll bars for the horizontal and vertical directions are prepared along the lower edge and the right edge of a window. A right scroll button or a left scroll button at either end of the horizontal scroll bar, or an upper scroll button or a lower scroll button at either end of the vertical scroll bar is selected by clicking on it with a mouse button. As is well known in the art, this causes data in the window to be scrolled in a desired direction.

The latest pointing device, "IntelliMouse" from Microsoft Corp., employs another form to provide a screen scroll operation. The structure and the function of the IntelliMouse will now be briefly explained. FIG. 8 shows the external appearance of the IntelliMouse. To attain the ease with which the IntelliMouse can be held, the body 150 of the IntelliMouse is formed substantially in a J shape, and a rotary ball 152 is provided on the bottom surface of the body 150.

One of the features of the IntelliMouse is the provision of a rotary switch 154, called a "wheel," that can be both rotated and depressed, and that is disposed between two conventional mouse buttons. The wheel 154 can be rotated forward or backward, each one step rotary displacement of the wheel being the equivalent of one click, and 18 steps constituting a complete revolution. A third mouse button (a middle button) can be emulated by depressing the wheel. Further, besides the independent employment available with the wheel, the combined use of the wheel and the "Ctrl" key or the "Shift" key on the keyboard can provide many additional functions. It should be noted, however, that special application software is required in order to make the wheel functions available, and that the wheel functions provided by the application software are slightly different. When application software is used that is not compatible with the use of the wheel, messages generated by the manipulation of the wheel are disregarded, and the IntelliMouse functions substantially the same as does a normal "two-button mouse."

Merely by rotating the wheel of the IntelliMouse forward or backward, it is possible to scroll a document on a screen (a one step rotary displacement of the wheel corresponds to the scrolling of three lines). Since unlike in the conventional case, it is not necessary for the mouse cursor to be moved to the scrolling bar at the window's circumferential edge, a user can easily scroll the screen without removing his or her eyes from the document/content of the window.

When the mouse is moved while the wheel is being depressed like a button and held, the document can be sequentially scrolled at a desired speed and in a desired direction. This function is called "panning" or "sequential scrolling," and when the wheel is released, the scrolling operation is terminated. Since the document is sequentially scrolled without the user removing his or her eyes from the document, a desired portion can be easily found.

Further, when the wheel is clicked once and the mouse is moved, the document is automatically scrolled. This function is called "auto scrolling" or the "reading mode."

The scrolling speed for the "panning" or the "auto scrolling" is proportional to the displacement of the mouse ball. The "scrolling speed" in this case is essentially equivalent to the total volume traveled when scrolling performed in accordance with a single scrolling instruction, the operation involving the clicking the wheel and the movement of the mouse. Since the cursor is moved the instructed total scroll volume at one time, displayed data seem to be scrolled rapidly in proportion to the total scrolling volume, so that the user assumes that the scrolling volume is equivalent to the scrolling speed.

Another specific function of the IntelliMouse is a "zoom" function by which the display of the document is enlarged/reduced. Further, a "data zoom" function is provided by which data is folded and hidden or folded data are reopened and displayed. Software products of Microsoft Corp., such as "Word97," "Excel97" and "InternetExplorer 3.0," support the above unique functions of the IntelliMouse. The IntelliMouse can be connected, for example, to the serial port of a PC, or to a PS/2 mouse port ("PS/2" is a trademark of IBM Corp.) of an IBM PC/AT compatible machine ("PC/AT" is a trademark of IBM Corp.).

The Trackpoint is a small lever input device embedded in about the center of a keyboard unit (i.e., centered relative to the "G", "H", "B" and "N" keys). A position corresponding to the operating point of the lever is enclosed in four directions by pressure sensors. When a user presses against the distal end (force point) of the stick with a finger, the pressure direction and force are detected by the individual sensors, and a signal equivalent to the displacement of the mouse ball is generated in accordance with the outputs of the sensors. Since one feature of the Trackpoint is that only a small mounting/operating area is required, the Trackpoint is used as a pointing device mainly for notebook PCS. Since a user can manipulate the TrackPoint without removing his or her hands from their home positions on the keyboard, it is especially convenient for the execution of software that requires keyboard input. The details for the Trackpoint are given in, for example, U.S. Pat. No. 5,521,596 and U.S. Pat. No. 5,579,033.

As is described above, when the IntelliMouse is employed, the "panning" function and the "auto scrolling" function permit data displayed in the application window to be scrolled merely by the employment of a simple manipulatory movement. In addition, the scrolling speed can be freely changed by moving the mouse in a desired direction while the wheel is depressed and held. These functions can be provided by using the IntelliMouse, which includes a "wheel," in a software environment that supports the wheel function.

When the scrolling speed for display data is variable, several problems arise. One of them is the occurrence of an event where, since the definition of a standard scrolling speed (or the definition of the total volume over which scrolling is to be executed in response to one scrolling instruction) differs for each user, the display data are scrolled a distance more than or less than that expected by a user, even though the same scrolling operation is performed.

It can be easily understood that, to resolve this problem, all that is needed is some method by which the current scrolling speed can be indicated. However, if a scrolling speed indicator, such as an LED, was additionally provided, the hardware would have to be changed and, accordingly, the application range would be limited. And since the LED indicator would be located outside the display screen, a user would have to take his or her eyes off the displayed data that are being processed in order to see the indicator, and this would be accompanied by deterioration of job continuity.

For the previously described IntelliMouse, the display of the mouse cursor is switched during the screen scrolling to visually provide the current scrolling speed. FIG. 9 shows a bitmap of the mouse cursor during the screen scrolling. In response to the depression of the wheel (or the middle button), the cursor is changed to the bitmap shown in FIG. 9(a), which indicates that screen scrolling is occurring. The mouse cursor comprises a circular cursor body located in the center, and four scrolling direction indicators, one located at each side of the cursor body and enclosing the cursor body. The individual indicators are shaped like isosceles triangles, and their vertexes indicate their respective scrolling directions. When a user moves the mouse in a desired scrolling direction, the original mouse cursor is changed and becomes semi-transparent, as is shown in FIG. 9(b), and only the scrolling direction indicator that corresponds to the desired/selected scrolling direction is displayed at a position apart from the rest of the cursor. The mouse cursor in FIG. 9(b) is an example in which downward or lower scrolling is performed. The interval (D) between the semi-transparent, original mouse cursor and the scrolling direction indicator that is displayed is proportional to the scrolling speed currently set (or the total distance to be traveled in response to one scrolling instruction).

In the mouse cursor display shown in FIG. 9, since the volume or interval which the scrolling direction indicator is separated from the original mouse cursor is proportional to the scrolling speed, a user can visually and intuitively comprehend an alteration in the scrolling speed. However, since there is no scale provided on the display screen that can be used to measure the interval between the mouse cursor and the indicator, a user will view the representation of the scrolling speed as only the "separation" of the indicator or the "approach" of the indicator. In other words, it is still difficult to instantly and quantitatively comprehend the scrolling speed.

An information processing apparatus that can change a scrolling speed to a desired speed is disclosed in Japanese Patent Publication No. Hei 8-166783. However, in this information processing apparatus, the change in the scrolling speed is performed in a scrolling speed control window (see FIG. 3 in the publication) that is displayed in a screen area separate from the window being processed. Therefore, a user is forced to take his or her eyes off the display data, and deterioration of job continuity occurs.

SUMMARY OF THE INVENTION

To overcome the above problems, it is one object of the present invention to provide an information processing apparatus (i.e., personal computer (PC)) having enhanced data entry and data review using a pointing device, such as a mouse, in a GUI (Graphical User Interface) environment.

Another object of the present invention is to provide an information processing apparatus that can adjust the scrolling speed for data displayed in an application window on a display (or the total volume to be traveled when scrolling is performed in response to a single scrolling instruction).

An additional object of the present invention is to provide an information processing apparatus that can employ a pointing device to adjust the scrolling speed for data displayed in an application window, and that can set up and display a visual scrolling speed is indicator that enables a user to easily apprehend the scrolling speed.

To achieve the above objects, according to a first aspect of the present invention, an information processing apparatus having a mouse cursor display function comprises: a display unit for displaying data on a bit mapped display screen; a pointing device for designating a coordinate location on the display screen, and for directing scrolling and setting a scrolling speed for data displayed on the display screen; mouse cursor control means for displaying a mouse cursor at a coordinate location on the display screen designated by the pointing device; scroll control means for scrolling data on the display screen in accordance with a display data scrolling instruction from the pointing device; and scrolling speed display means for displaying speed indicators in a number equivalent to the value of a scrolling speed set by the pointing device while scrolling data on the display screen.

According to a second aspect of the present invention, an information processing apparatus having a mouse cursor display function comprises: a display unit for displaying data on a bit mapped display screen; a pointing device having a coordinate displacement input means for inputting a coordinate displacement and having at least one button with which both clicking and releasing operations are permitted; mouse cursor control means for, while a specific button of the pointing device is released, moving a mouse cursor on the display screen in accordance with the coordinate displacement value input through the coordinate displacement input means; scroll control means for, while a specific button of the pointing device is clicked, scrolling the data on the display screen in accordance with the coordinate displacement value input through the coordinate displacement input means; and scrolling speed display means for displaying speed indicators in a number equivalent to a scrolling volume instructed by the coordinate displacement input means while scrolling data on the display screen.

According to a third aspect, an information processing apparatus having a mouse cursor display function comprises: a processor for executing a software program; a memory for temporarily storing program code and data being executed; a display unit having a bit mapped display screen on which the contents of the processed program are displayed; a pointing device having a coordinate displacement input means for inputting a coordinate displacement and having at least one button with which both clicking and releasing operations are permitted; mouse cursor control means for, while a specific button of the pointing device is released, moving a mouse cursor on the display screen in accordance with the coordinate displacement value input through the coordinate displacement input means; scroll control means for, while a specific button of the pointing device is clicked, scrolling data on the display screen in accordance with the coordinate displacement value input through the coordinate displacement input means; and scrolling speed display means for displaying speed indicators in a number equivalent to a scrolling volume instructed by the coordinate displacement input means while scrolling data on the display screen.

According to a fourth aspect, provided is an information processing apparatus with a mouse cursor display function, which provides a multiple window environment where more than one window is displayed on a bit mapped display screen of a display unit, the information processing apparatus comprising: a processor for executing a software program; a memory for temporarily storing program code and data being executed; a pointing device having a coordinate displacement input means for inputting a coordinate displacement, and at least one button for which both clicking and releasing operations are permitted; mouse cursor control means for, while a specific button of the pointing device is released, moving a mouse cursor on the display screen in accordance with the coordinate displacement value input through the coordinate displacement input means; scrolling control means for, while a specific button of the pointing device is clicked, scrolling data in a currently active window in accordance with the coordinate displacement value input through the coordinate displacement input means; and scrolling speed display means for displaying speed indicators in a number equivalent to a scrolling volume instructed by the coordinate displacement input means while scrolling data on the display screen.

In the information processing apparatus according to the first to the fourth aspects, the scrolling speed display means may arrange speed indicators from about the center of the mouse cursor in a scrolling direction.

The information processing apparatus according to the second to the fourth aspects further comprise means for changing the mouse cursor display in response to whether a specific button of the pointing device being clicked or released.

According to a fifth aspect, provided is a mouse cursor appearing on a display screen of an information processing apparatus that provides a bit mapped display and a GUI environment and designates a coordinate location using a pointing device, the mouse cursor comprising: a mouse cursor body located at the coordinate location designated by using the pointing device; and one or more speed indicators appearing in a number equivalent to a scrolling speed while scrolling data on the display screen.

According to a sixth aspect, provided is a mouse cursor appearing on a display screen of an information processing apparatus, to which is installed a multiple window system to display one or more windows in a bit mapped display form and under a GUI environment, and which designates a coordinate location using a pointing device, the mouse cursor comprising: a mouse cursor body located at the coordinate location designated using the pointing device; and one or more speed indicators appearing in a number equivalent to a scrolling speed while data in a currently active window is to be scrolled.

In the mouse cursor according to the fifth and the sixth aspects, the one or more speed indicators may be arranged from about the center of the mouse cursor in a scrolling direction.

Display of the mouse cursor in the fifth and the sixth aspects may be changed between normal mouse cursor moving and display data scrolling.

According to a seventh aspect, provided is a control method for an information processing apparatus, having a mouse cursor display function, that includes a display unit for displaying data on a bit mapped display screen; and a pointing device for designating a coordinate location on the display screen, and for directing scrolling and setting a scrolling speed of data displayed on the display screen, the control method comprising the steps of: (a) displaying a mouse cursor at a coordinate location on the display screen designated by the pointing device; (b) scrolling data on the display screen in accordance with a display data scrolling instruction from the pointing device; and (c) displaying speed indicators in a number equivalent to the value of a scrolling speed set by the pointing device while scrolling data on the display screen.

According to an eighth aspect, provided is a control method for an information processing apparatus having a mouse cursor display function, that includes a display unit for displaying data on a bit mapped display screen; and a pointing device having a coordinate displacement input means for inputting a coordinate displacement and having at least one button with which both clicking and releasing operations are permitted, the control method comprising the steps of: (a) moving, while a specific button of the pointing device is released, a mouse cursor on the display screen in accordance with the coordinate displacement value input through the coordinate displacement input means; (b) scrolling, while a specific button of the pointing device is clicked, data on the display screen in accordance with the coordinate displacement value input through the coordinate displacement input means; and (c) displaying speed indicators in a number equivalent to a scrolling volume instructed by the coordinate displacement input means while scrolling data on the display screen.

According to a ninth aspect, provided is a control method for an information processing apparatus having a mouse cursor display function, that includes a processor for executing a software program; a memory for temporarily storing program code and data being executed; a display unit having a bit mapped display screen on which the contents of the processed program are displayed; and a pointing device having a coordinate displacement input means for inputting a coordinate displacement and having at least one button with which both clicking and releasing operations are permitted, the control method comprising the steps of: (a) moving, while a specific button of the pointing device is released, a mouse cursor on the display screen in accordance with the coordinate displacement value input through the coordinate displacement input means; (b) scrolling, while a specific button of the pointing device is clicked, data on the display screen in accordance with the coordinate displacement value input through the coordinate displacement input means; and (c) displaying speed indicators in a number equivalent to a scrolling volume instructed by the coordinate displacement input means while scrolling data on the display screen.

According to a tenth aspect, provided is a control method for an information processing apparatus having a mouse cursor display function, that includes a processor for executing a software program; a memory for temporarily storing program code and data being executed; and a pointing device having a coordinate displacement input means for inputting a coordinate displacement and having at least one button with which both clicking and releasing operations are permitted and that provides a multiple window environment where more than one window is displayed on a bit mapped display screen of a display unit, the control method comprising the steps of: (a) moving, while a specific button of the pointing device is released, a mouse cursor on the display screen in accordance with the coordinate displacement value input through the coordinate displacement input means; (b) scrolling, while a specific button of the pointing device is clicked, data in a currently active window in accordance with the coordinate displacement value input through the coordinate displacement input means; and (c) displaying speed indicators in a number equivalent to a scrolling volume instructed by the coordinate displacement input means while scrolling data on the display screen.

In the control method according to the seventh to the tenth aspects, at the step (c) speed indicators may be arranged from about the center of the mouse cursor in a scrolling direction.

The control method according to the eighth to the tenth aspects further comprise a step of changing the mouse cursor display in response to whether a specific button of the pointing device being clicked or released.

According to an eleventh aspect, provided is a computer readable storage medium for tangibly storing a computer program operated by a computer system that includes a display unit for displaying data on a bit mapped display screen; and a pointing device for designating a coordinate location on the display screen, and for directing scrolling and setting a scrolling speed for data displayed on the display screen, the computer program comprising: (a) a routine for displaying a mouse cursor at a coordinate location on the display screen designated by the pointing device; (b) a routine for scrolling data on the display screen in accordance with a display data scrolling instruction from the pointing device; and (c) a routine for displaying speed indicators in a number equivalent to the value of a scrolling speed set by the pointing device while scrolling data on the display screen.

According to a twelfth aspect, provided is a computer readable storage medium for tangibly storing a computer program operated by a computer system that includes a display unit for displaying data on a bit mapped display screen; and a pointing device having a coordinate displacement input means for inputting a coordinate displacement and having at least one button with which both clicking and releasing operations are permitted, the computer program comprising: (a) a routine for, while a specific button of the pointing device is released, moving a mouse cursor on the display screen in accordance with the coordinate displacement value input through the coordinate displacement input means; (b) a routine for, while a specific button of the pointing device is clicked, scrolling data on the display screen in accordance with the coordinate displacement value input through the coordinate displacement input means; and (c) a routine for displaying speed indicators in a number equivalent to a scrolling volume instructed by the coordinate displacement input means while scrolling data on the display screen.

According to a thirteenth aspect, provided is a computer readable storage medium for tangibly storing a computer program operated by a computer system that includes a processor for executing a software program; a memory for temporarily storing program code and data being executed; a display unit having a bit mapped display screen on which the contents of the processed program are displayed; and a pointing device having a coordinate displacement input means for inputting a coordinate displacement and having at least one button with which both clicking and releasing operations are permitted, the computer program comprising: (a) a routine for, while a specific button of the pointing device is released, moving a mouse cursor on the display screen in accordance with the coordinate displacement value input through the coordinate displacement input means; (b) a routine for, while a specific button of the pointing device is clicked, scrolling data on the display screen in accordance with the coordinate displacement value input through the coordinate displacement input means; and (c) a routine for displaying speed indicators in a number equivalent to a scrolling volume instructed by the coordinate displacement input means while scrolling data on the display screen.

According to a fourteenth aspect, provided is a computer readable storage medium for tangibly storing a computer program operated by a computer system that includes a processor for executing a software program; a memory for temporarily storing program code and data being executed; and a pointing device having a coordinate displacement input means for inputting a coordinate displacement and having at least one button with which both clicking and releasing operations are permitted and that provides a multiple window environment where more than one window is displayed on a bit mapped display screen of a display unit, the computer program comprising: (a) a routine for, while a specific button of the pointing device is released, moving a mouse cursor on the display screen in accordance with the coordinate displacement value input through the coordinate displacement input means; (b) a routine for, while a specific button of the pointing device is clicked, scrolling data in a currently active window in accordance with the coordinate displacement value input through the coordinate displacement input means; and (c) a routine for displaying speed indicators in a number equivalent to a scrolling volume instructed by the coordinate displacement input means while scrolling data on the display screen.

In the computer readable storage medium according to the eleventh to the fourteenth aspects, in the routine (c) speed indicators may be arranged from about the center of the mouse cursor in a scrolling direction.

The computer readable storage medium according to the twelfth to the fourteenth aspects further comprise a routine for changing the mouse cursor display in response to whether a specific button of the pointing device being clicked or released.

The information processing apparatus of the present invention provides a GUI (Graphical User Interface) environment on a bit mapped display screen. One or more windows are opened on the display screen, and a currently active application window (e.g., the active window) is displayed in the foreground. On the display screen (i.e., the "desktop"), a mouse cursor is located at a coordinate position designated by a pointing device, such as a mouse or a Trackpoint, and is permitted to move freely on the desktop in accordance with the displacement of the mouse ball.

When the scrolling of data displayed in an active window is instructed, the display form of the mouse cursor (i.e., the bitmap) is changed. In this enhanced mouse cursor, in addition to a center mouse cursor body, at least one speed indicator is displayed in the scrolling direction. The speed indicators appear in a number which corresponds to the set scrolling speed, and are arranged from about the center of the mouse cursor body in the scrolling direction. A speed indicator is shaped like a small isosceles triangle, and when its vertex is facing in the scrolling direction, it is a very effective visual aid for a user.

As the number of the speed indicators is increased, such as from one when the scrolling speed is low, to two when the scrolling speed is moderate, and to three when the scrolling speed is relatively high, the speed indicators are extended in the scrolling direction in accordance with the current scrolling speed, so that a user can intuitively and quantitatively comprehend the current scrolling speed. Since the speed indicators are displayed in the vicinity of the mouse cursor, a user does not need to remove his or her eyes from a focus point on the display screen and the continuity of the operation can be maintained.

The computer readable storage medium of the eleventh to the fourteenth aspects defines the structural or functional interrelationship between the computer program and the storage medium for implementing the functions of the computer program on a computer system. In other words, the computer storage medium is inserted into the computer system (or the computer program is installed in the computer system), and their interrelational operation is performed on the computer system. As a result, the same effect obtained by the information processing apparatus in the first to the fourth aspects of the present invention can be provided.

The other objects, features, and advantages of the present invention will become apparent in due course during the detailed description of the preferred embodiment of the present invention, which will be given while referring to the accompanying drawings.

DESCRIPTION OF THE PREFERRED EMBODIMENT

Figure 1:
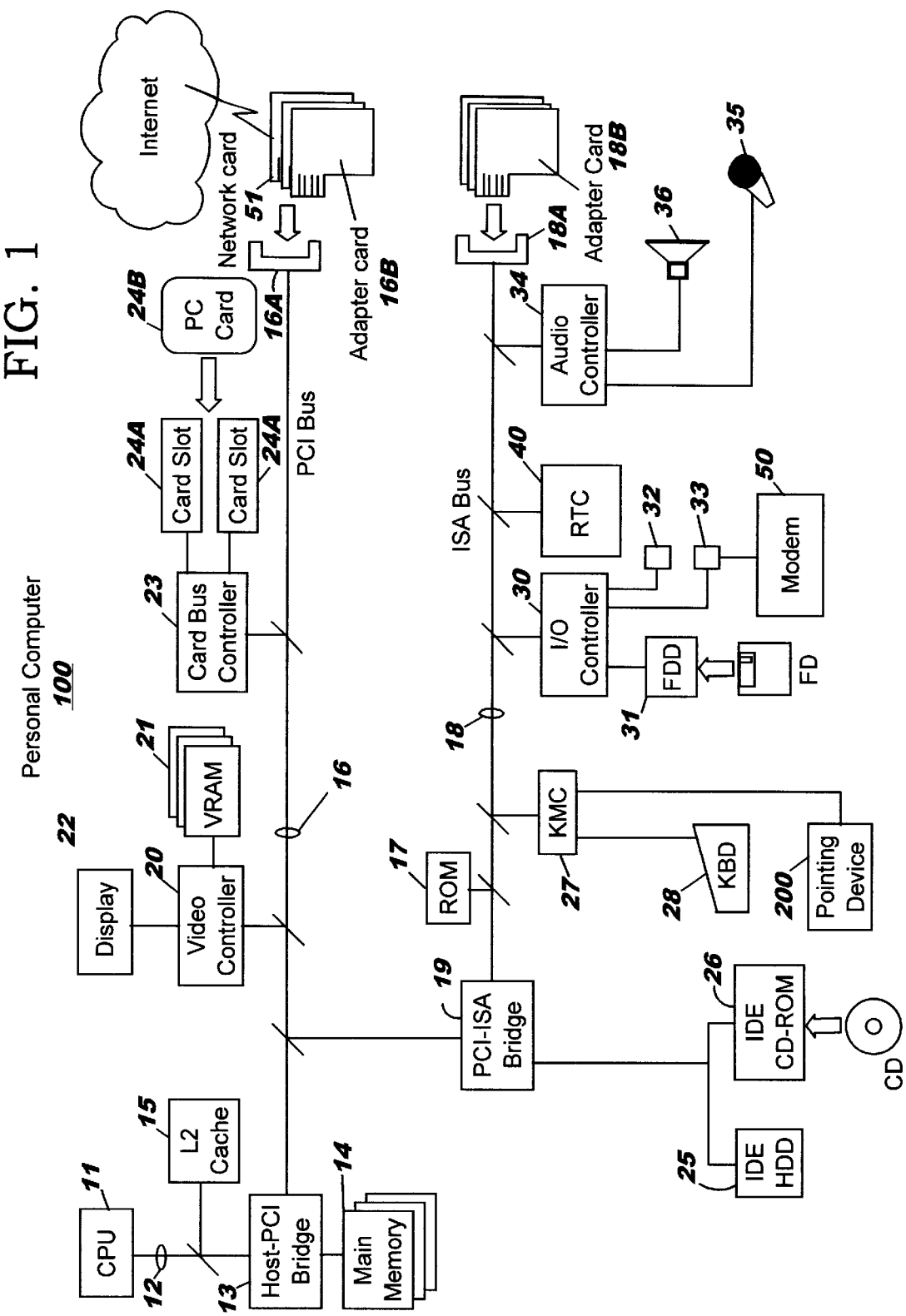
FIG. 1 is a schematic diagram illustrating the hardware arrangement of a typical personal computer in which the present invention may be practiced.

The preferred embodiment of the present invention will now be described while referring to the drawings.

A. Hardware arrangement of a personal computer (PC)

FIG. 1 is a schematic block diagram illustrating the hardware arrangement of a typical personal computer (PC) 100 in which the present invention may be embodied. This example PC conforms to the OADG (PC Open Architecture Developer's Group) specifications. A preferable operating system for the PC provides a multitasking environment, such as "Windows95" from Microsoft Corp. or "OS/2" from IBM Corp. The individual hardware components illustrated in FIG. 1 will now be described.

A CPU 11, a main controller, executes various programs under the control of the operating system (OS). The CPU 11 may be a "Pentium" CPU chip from Intel Corp. The CPU 11 is interconnected to individual hardware components (which will be described later) via three buses. A processor bus 12 is directly connected to the external pins of the CPU 11. A PCI (Peripheral Component Interconnect) bus 16 serves as a local bus, and an ISA (Industry Standard Architecture) bus 18 serves as a system bus. The processor bus 12 communicates with the PCI bus 16 through a bridge circuit (host-PCI bridge) 13. The bridge circuit 13 in this embodiment includes a memory controller for controlling the access to main memory 14, and a data buffer for absorbing the speed difference between the buses 12 and 16.

The main memory 14 is volatile memory and is used as a loading area for program code, or as a work area for an executing program. Generally, the main memory 14 consists of a plurality of DRAM (Dynamic RAM) chips. A memory capacity of, for example, 32 MB is provided as a standard and can be expanded to 256 MB. The programs to be executed include application programs, Windows95 or another multitasking OS, and device drivers, such as a mouse/Trackpoint driver ("Scroll Mapper") and a "mouse driver" (both of which will be described later), both of which are provided by the present invention. An L2-cache 15 is high-speed memory for absorbing the time required to access the main memory 14. A very limited amount of code and data that the CPU 11 frequently accesses are temporarily stored in the L2-cache 15. Generally, the L2-cache 15 consists of SRAM (Static RAM) chips, and its memory capacity is, for example, 512 KB.

The PCI bus 16 is a bus for relatively fast data transfers. PCI devices, such as a video controller 20 and a card bus controller 23 that are operated at relatively high speeds, are connected to the PCI bus 16. The PCI architecture was originated and advocated by Intel Corp., and implements the PnP (Plug-and-Play) function. The video controller 20 is a dedicated controller for the actual processing of graphics commands received from the CPU 11. The processed graphics information is temporarily written in a screen buffer (VRAM) 21, and then is read from the VRAM 21 and output as display data to an LCD (liquid crystal display) or CRT (Cathode Ray Tube) display 22. The video controller 20 in this embodiment has either an XGA (extended Graphic Array) function or an SVGA (Super Video Graphic Array) function, and supports a bit-mapped display.

The card bus controller 23 is a dedicated controller for connecting a bus signal on the PCI bus 16 directly to a PC card slot 24A (Cardbus). A PC card 24B, which conforms to the standards (e.g., "PC Card Specification 95") developed by PCMCIA (Personal Computer Memory Card International Association) and JEIDA (Japan Electronic Industry Development Association), can be inserted into the PC card slot 24A. The PC card 24B may be, for example, a modem card or a LAN card for network connection, a SCSI card for externally connecting various types of SCSI (Small Computer System Interface) devices, or an HDD card serving as an external storage device of a PC.

The PCI bus 16 and the ISA bus 18 are mutually connected by a bridge circuit (PCI-ISA bridge) 19. The bridge circuit 19 in this embodiment includes a DMA controller, a programmable interrupt controller (PIC) and a programmable interval timer (PIT). The DMA controller is a dedicated controller for performing data transfers between peripheral devices and the main memory 14 without the involvement of the CPU 11. The PIC is a dedicated controller for processing an interrupt request (IRQ) from the peripheral devices. The PIT is a device for generating in a predetermined cycle a tone generation time signal having a rectangular wave.

The PIC allocates a plurality of its IRQ levels to the peripheral devices for the execution of programs (interrupt handlers) corresponding to the generated IRQ levels, as is well known in the art. In a PC/AT compatible machine ("PC/AT" is a trademark of IBM Corp.), for example, IRQ1 is allocated for a keyboard 28, and IRQ12 is allocated for a pointing device 200 such as a mouse. When an event occurs at the pointing device 200, the "mouse driver" is executed as an interrupt handler, which will be described later.

The bridge circuit 19 in this embodiment also has an IDE connector to connect an external storage device that conforms to the IDE (Integrated Drive Electronics) specifications. An external storage device, such as an IDE hard disk drive (HDD) 25 or an IDE CD-ROM drive 26, are connected to the IDE connector. The HDD 25 is superior in access speed to other external storage devices. When a software program (an OS, a device driver, application software, etc.) is copied to the HDD 25 (i.e., installed in the system), the software program is prepared for execution by the system. A CD-ROM drive 26 is used mainly to install software programs (CD-ROM data) stored on compact disks (CDs), or to reproduce music data (CD-DA data) on CDS. The device driver "Scroll Mapper" and the "mouse driver" may be provided on a CD for the PC 100 and may be installed via the CD-ROM drive 26.

The ISA bus 18 is a bus along which the data transfer speed is lower (a bus width of 16 bits and a maximum data transfer speed of 4 MBps) than that of the PCI bus 16. The ISA bus 18 is used to connect peripheral devices, such as a ROM 17, a keyboard/mouse controller (KMC) 27, an I/O controller 30, an audio controller 34 and a real time clock (RTC) 40, that are driven at relatively low speeds.

A ROM 17 is nonvolatile memory for the permanent storage of a code group including BIOS (Basic Input/Output System) for managing the hardware components such as the keyboard 28 and the video controller 20, and test programs including POST (Power On Self Test) that is run at the time when the PC system 100 is powered on.

A keyboard/mouse controller 27 is a dedicated controller for fetching, as computer data, scan code input through the keyboard 28, or coordinate values designated by the pointing device 200. A mouse, for example, is popularly used as the pointing device 200. Further input devices are a TrackPoint I/II/III (hereinafter referred to as "TrackPoint"), which is mounted on the keyboard unit of the notebook PC "ThinkPad" series sold by IBM ("ThinkPad" is a trademark of IBM Corp.); a track ball; a joystick; a touch pad; or a pen. To implement the present invention, the pointing device 200 must include a function for inputting a designated coordinate; a function (clicking) for selecting a specific area; a function for instructing the scrolling of display data; and a function for setting a scrolling speed (or a total distance or interval to be scrolled in response to a single scroll instruction). These details, however, will be described later.

An I/O controller 30 is a peripheral controller for driving a floppy disk drive (FDD) 31, and for controlling the input/output (PIO) of parallel data through a parallel port 32 and the input/output (SIO) of serial data through a serial port 33. A printer (not shown), for example, is connected to the parallel port 32, and a modem 50 is connected to the serial port 33. The FDD 31, as well as the HDD 25 and the CD-ROM 26, is one type of external storage device. The FDD 31 is used primarily to install in the system a software program that is provided on a floppy disk (FD), or to store work data or files on the FD. The device driver "Scroll Mapper" and the "mouse driver" which are used for the present invention, may be supplied on a CD and installed to the PC system 100.

The modem 50 is a device for transmitting digital computer data across an analog public switch telephone network (PSTN). The modem 50 includes circuit components, such as a signal processor (a modem chip) for modulating transmitted data and demodulating received data, and a data access arrangement circuit (DAA) for connecting a modem to a public switch telephone network in accordance with the line switch standards of each country. With the modem 50 attached, the PC system 100 can be connected through the PSTN to a wide area network, such as the Internet, and can thus read a file (an HTML file) from a WWW server by using a WWW browser. Also, the device driver "Scroll Mapper" and the "mouse driver" implementing the present invention can be downloaded from a predetermined WWW server and thereby installed into the PC system 100.

An audio controller 34 is a dedicated controller for processing the input/output of audio signals. An audio signal input from a microphone 35 is fetched as computer data, or a DA conversion is performed on the audio data and the resultant data is output though a speaker 36.

The real time clock (RTC) 40 is a device for measuring the current time. Generally, the RTC 40 and a CMOS memory (not shown) are mounted together on a single chip. The CMOS memory is used to store information, such as system configuration information and a power ON password, that is required for the security/safety of the PC system 100. The RTC/CMOS 40 is backed up by a reserve battery (ordinarily a coin battery, which is not shown) so that the contents obtained by measurement and the stored data are not lost even when the PC system 100 is powered off.

One or more PCI bus slots 16A or ISA bus slots 18A are provided at one end of the bus 16 or the bus 18 (although the bus slots 16A and 18A may be provided by a docking station. PCI adaptor cards 16B and ISA adaptor cards 18B can be inserted into the bus slots 16A and 18A, respectively. A PCI adaptor card 16B can be, for example, a network card for connection to a LAN (e.g., Ethernet or Tokenring). When the LAN adaptor card is inserted into the bus slot, the PC 100 can be connected through the LAN to an external device (e.g., another PC or a remote printer), or through a gateway (a router) to a wide area network, such as the Internet. As a result, a WWW server can be accessed by using a WWW browser to read a file (an HTML file). The device driver "Scroll Mapper" and the "mouse driver" of the present invention can be downloaded through the Internet from a remote server and installed in the PC system 100.

A typical user of the personal computer 100 operates the PC system 100 using the keyboard 28 or the mouse 200 and executes various application programs, such as for word processing, working with a database, and communication, in order to use them in accomplishing his or her job. The user can install a desired software program in the PC system 100 by copying it from the CD-ROM drive 26 or the FDD 31 to the HDD 25. The user can download to the HDD 25 a desired software program from a Web server connected across a network and thereby install it into the PC system 100.

An icon for an installed software program is registered in the window system and is displayed on the desktop. The user can select a specific icon by using the pointing device 200 and designating it (e.g., "double clicking" of the mouse button) to activate the associated software program. When the activated software program is a word processing program, a document editing window that occupies at least part of the desktop appears in the foreground on a display screen 22. In the document editing window, not only is the window itself prepared for the display of data, but also a title bar, a menu bar and a tool bar are prepared and displayed, typically in the named order beginning at the top of the window, in accordance with known techniques. Ordinarily, the window is only large enough to display one portion of a file being edited, and the displayed portion of the file being edited is moved horizontally and vertically in accordance with the scrolling instructions issued by using a cursor key or the pointing device 200. The scrolling operation in this embodiment will be described in detail later.

Personal computers currently available on the market fully satisfy the hardware configuration that would enable them to serve as the PC system 100 of FIG. 1. Although many elements in addition to those shown in FIG. 1 are required to construct the PC system 100, they are well known to one having ordinary skill in the art. And as they are not directly related to the subject invention, no explanation for them will be given. Further, it should be noted that, to avoid making the drawings too complex, only portions of the connections between the components of FIG. 1 are shown.

B. Data input mechanism using pointing device 200

Figure 2:
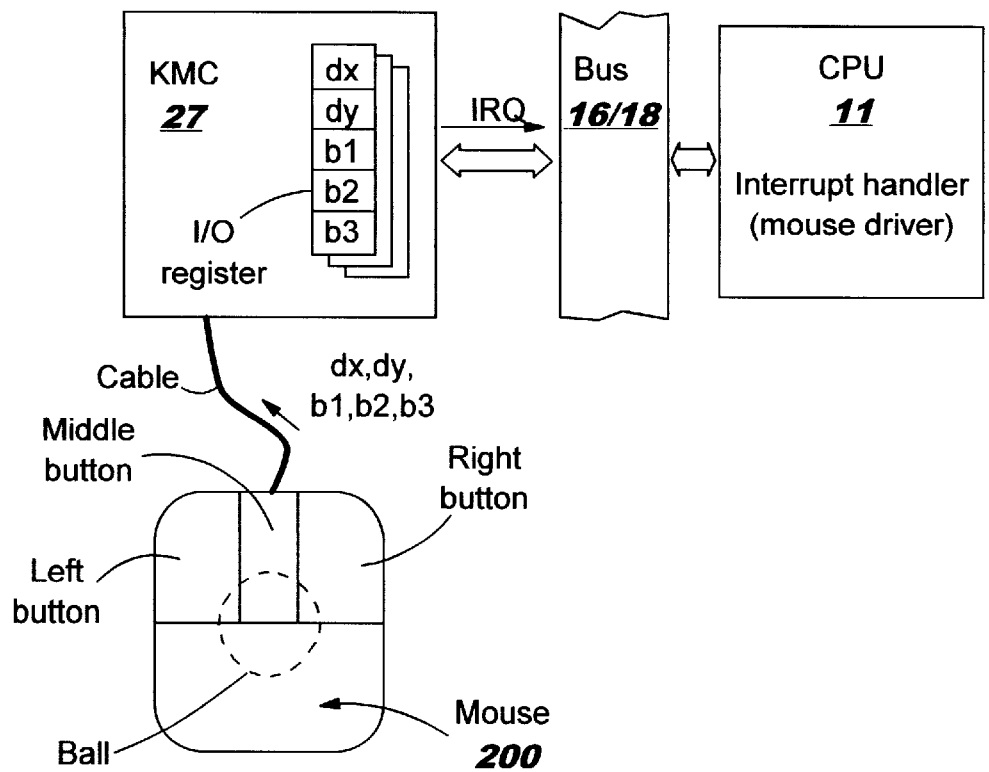
FIG. 2 is a schematic diagram for explaining a hardware mechanism for processing data input using a pointing device 200.

FIG. 2 is a schematic diagram that depicts the components for processing data input via the pointing device 200. Preferably, in the same manner as a so-called three-button mouse, the pointing device 200 in this embodiment has a middle button inserted between the right and left buttons, the latter two being used for conventional mouse manipulation. However, it should be noted that so long as the conventional right and left buttons are employed to emulate a similar scrolling operation, an additional mechanical button is not necessary. The mouse 200 includes a mouse body that a user grasps, three buttons provided on the top of the body, and a rotatable ball installed at the bottom. The rotation of the ball is, for example, optically read, the rotation direction and the rotation volume of the ball are encoded, and the resultant data are output as a displacement (dx, dy) along x and y axes. The operational states of the left button (b1), the middle button (b2) and the right button (b3) are output as 1 when "depressed" and as 0 when "released." The mouse 200 transmits detected values (dx, dy, b1, b2, b3) to the KMC 27 at intervals of several of tens of msec each.

The KMC 27 is connected via the buses to the CPU 11, and includes an I/O register that the CPU 11 can access. One part of the I/O register is allocated for a field in which to write the above detected values (dx, dy, b1, b2, b3). When one of the values (dx, dy, b1, b2, b3) is updated, the KMC 27 generates an interrupt request (IRQ) and issues a notification to that event. The IRQ level that is used by the KMC 27 for issuing the notification of the event through the mouse is IRQ 12 on the PC/AT compatible machine. Upon receipt of the notification that an IRQ 12 has been issued, the CPU 11 forcibly halts the execution of a command from an executing program (the OS or application software), and executes the "mouse driver," the IRQ 12 interrupt handler.

The mouse driver accesses the KMC 27 for I/O reading, and reads the values (dx, dy, b1, b2, b3) detected by the mouse 200. When the middle button is not clicked, i.e., when b2=0, it is assumed that the displacement values (dx, dy) for the ball indicate a normal moving of the mouse cursor, and a message for that event is inserted to a queue in the operating system (OS). A window system (which will be described later), in response to receiving the message in the queue, moves the mouse cursor on the display screen 22 a distance the equivalent of the displacement of the mouse ball. As the normal mouse cursor operation is not directly related to the subject of the present invention, no further explanation for it will be given.

When the middle button is clicked, i.e., when b2=1, the mouse driver assumes that the displacement (dx, dy) of the ball is not related to the moving of the mouse cursor but to the scrolling in an active window. The mouse driver inserts a message into the queue of the OS (in this embodiment, hereinafter referred to as "ScrollMsg") for drawing the mouse cursor at the time of scrolling. Then, the Scroll Mapper, in response to receiving the ScrollMsg from the queue, draws the mouse cursor in accordance with an instructed scrolling speed (the total interval to be scrolled by a single scroll instruction). Also, the Scroll Mapper transmits to an active application (e.g., word processing software), through the queue of the OS, a message instructing the total interval the display data will be scrolled. A description of the detailed operation of the Scroll Mapper will be described later.

When the middle button is released, i.e., when the value of b2 is changed from 1 to 0, the mouse driver assumes that the scrolling operation in the active window is to be halted. Following this, the mouse driver transmits a message (in this embodiment, hereinafter referred to as "RestoreMsg") to the Scroll Mapper, through the queue of the OS, to return the display of the mouse cursor to its normal state.

The pointing device 200 may be a TrackPoint instead of the mouse. As previously described, the TrackPoint is a small lever input device embedded in the center of a keyboard unit. For the TrackPoint, the displacement values (dx, dy) in the x and y axial directions are obtained from the outputs of pressure sensors that enclose an operating location of the lever to the front and the back and on the sides. A small mounting/operation area is satisfactory for the TrackPoint. In addition, since a user can manipulate the TrackPoint without removing his or her hands from their home positions on the keyboard, the TrackPoint is particularly effective when the software accompanying the keyboard input is executed. In this case, it is also preferable that an additional button in addition to the conventional right and left buttons be prepared like a so-called three-button mouse.

C. Software for processing data input using pointing device 200

Figure 3:
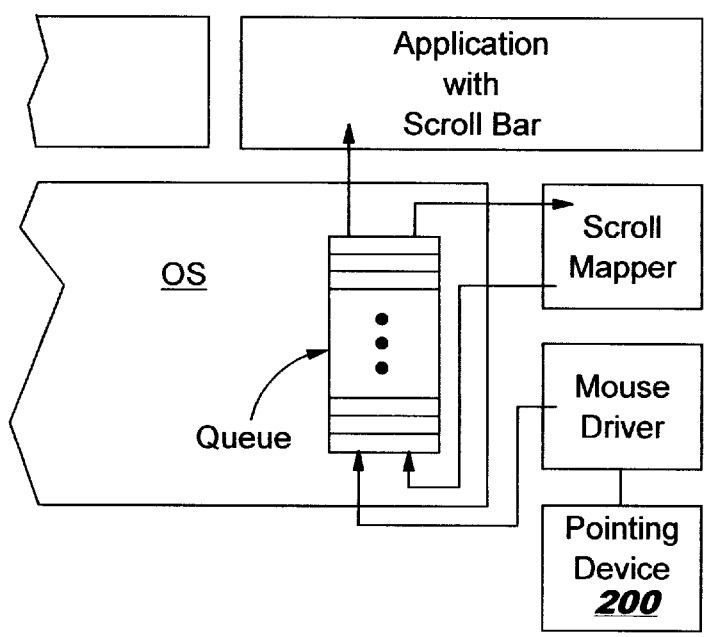
FIG. 3 is a conceptual diagram for explaining an interactive relationship of software programs for the scrolling of a display screen according to the present invention.

FIG. 3 is a conceptual diagram for explaining an interrelational relationship of software programs when implementing a scrolling operation on a display screen embodying the present invention. Device drivers are software components for controlling the input/output operations of corresponding devices. In FIG. 3, the "mouse driver" and the "Scroll Mapper" correspond to the device drivers.

The mouse driver is a device driver for directly performing the input and output operation for the pointing device 200. The mouse driver is an interrupt handler for the IRQ 12 used by the pointing device 200, and is executed by the CPU 11 in response to the occurrence of the IRQ 12. More specifically, the mouse driver accesses the KMC 27 to read I/O data, and reads the values (dx, dy, b1, b2, b3) detected by the mouse 200. When the middle button is not clicked, i.e., when b2=0, it is assumed that the displacement values (dx, dy) of the ball indicate the normal moving of the mouse cursor, and a message for that event is inserted into a queue in the operating system (OS). When the middle button is clicked, i.e., when b2=1, the mouse driver assumes that the displacement values (dx, dy) for the ball are not intended for the moving of the mouse cursor but for the scrolling of data in an active window. The mouse driver transmits the message "ScrollMsg" to the Scroll Mapper through the queue of the OS. When the middle button is released, i.e., when the value of b2 is changed from 1 to 0, the mouse driver assumes that the scrolling operation in the active window is to be halted. Following this, the mouse driver transmits, through the queue of the OS, message "RestoreMsg" to the Scroll Mapper to return the display of the mouse cursor to its normal state.

The Scroll Mapper is a device driver for drawing the mouse cursor during scrolling and is located immediately above the mouse driver. When the Scroll Mapper receives the message "ScrollMsg" from the queue of the OS, it draws the mouse cursor in accordance with an instructed scrolling speed, i.e., the total interval to be scrolled upon a single scroll instruction. For scrolling the display data, the Scroll Mapper transmits a message indicating the total interval to be scrolled through the queue of the OS to the active application which actually scrolls the display data. Further, upon receipt of the "RestoreMsg" from the queue of the OS, the Scroll Mapper draws the original mouse cursor, i.e., the mouse cursor normally shown during ordinary operation. The form of the mouse cursor drawn by the Scroll Mapper during the enhanced scrolling according to the present invention will be described later in detail.

Although various other device drivers, such as a display driver for outputting data to the display unit 22 and a CD-ROM driver for driving the CD-ROM drive 26, are required for the normal operation of the PC system 100, these are known in the art and no further explanation for them will be given.

An operating system (OS) is the basic software program employed for the overall management of the hardware and software components in the PC system 100, and corresponds to the previously mentioned "Windows95" or "OS/2," or to "UNIX." Preferably, to implement the mouse cursor display of the present invention, the OS should support a multitasking environment. The OS is generally constructed with a kernel area and a user area.

The kernel area is a portion wherein basic functions are provided for monitoring the operation of the PC system 100 and for supporting the execution of programs such as application programs. In the kernel area are provided a "file manager," for managing file access to an external storage device, such as the HDD 25; a "scheduler," for managing the order and the priority for the execution of tasks; a "memory manager," for managing the memory space; and a "configuration manager," for managing the allocation (configuration) of the system resources, such as I/O addresses, IRQ levels and DMA levels. The "scheduler" includes a "queue" where a received message (task) is dispatched on a first-in-first-out (FIFO) basis.

The user area consists of a function routine portion for supporting the user who selects an application, and includes, for example, a "user interface" and a "window system." The user interface (also called a "Shell") interprets a command from a user and transmits it to the kernel, and relays the response provided by the kernel to the user. At the present time when bitmapped display functions are common, a "graphical user interface (GUI)" is employed that mainly displays objects, such as icons, on a screen and enables a user to input data by manipulating a mouse. In this embodiment, it is assumed that the GUI environment is employed.

The window system, which is a function for displaying a window on the display 22, allocates a frame window for each active application, and sequentially switches the activities of the individual applications. The window system prepares a horizonal scroll bar or a vertical scroll bar at the lower edge or at the right edge of the window when all the processed data in the application (e.g., a text file edited by using word processing software) can not be displayed within the area of the frame window. "Presentation Manager" in OS/2, and "X-Windows" in UNIX correspond to the window system.

The application programs at the uppermost level are software for directing the use of the PC system 100 for specific practical applications. Applications corresponding to such programs are, for example, word processing software, spreadsheet software, communication software and browsing software (WWW browsers). A frame window, or the corresponding "button" within a task bar (in case of Windows 95), is allocated for each active application executed by the PC system 100.

When a window for an application is displayed and the area of data to be displayed in the window exceeds the area available for display in the frame window, at least one of the horizontal and the vertical scroll bars for screen scrolling is displayed. Displayed data are scrolled upon the clicking of a scrolling button on one of the scroll bars (previously described). The application also scrolls display data upon receipt of the message "ScrollMsg" instructing the scrolling operation.

Generally, a user of the computer system 100 can acquire a desired software program (an OS, a device driver, application software, etc.) that is stored on a storage medium, such as an FD or a CD-ROM. The storage medium is loaded into a drive unit, such as the FDD 31 or the CD-ROM drive 26, and the desired program is copied to a disk of the HDD 25 (i.e., installed in the PC system 100), so that the program can be promptly executed by the PC system 100. Recently, for the installation of programs, there has been an increase in such cases where a program is downloaded from a storage device of an external computer system (e.g., a WWW server) connected to the PC system 100 through a network (such as the Internet) by the modem 50 or the LAN adaptor 16B.

D. Screen Scrolling Operation

The hardware and software arrangements of the computer system 100 that can implement the present invention have been explained above. Also, an explanation has been given for the employment of a software program, installed in the PC system 100, to accomplish the computer operation according to this embodiment of the present invention, and the provision of the software program on a storage medium, such as an FD or a CD-ROM. A screen scrolling operation to be executed by the PC system 100 and an associated mouse cursor display operation will now be described. It should be noted that the mouse cursor display operation is performed by the interrelational operation with the software discussed above.

Figure 4:
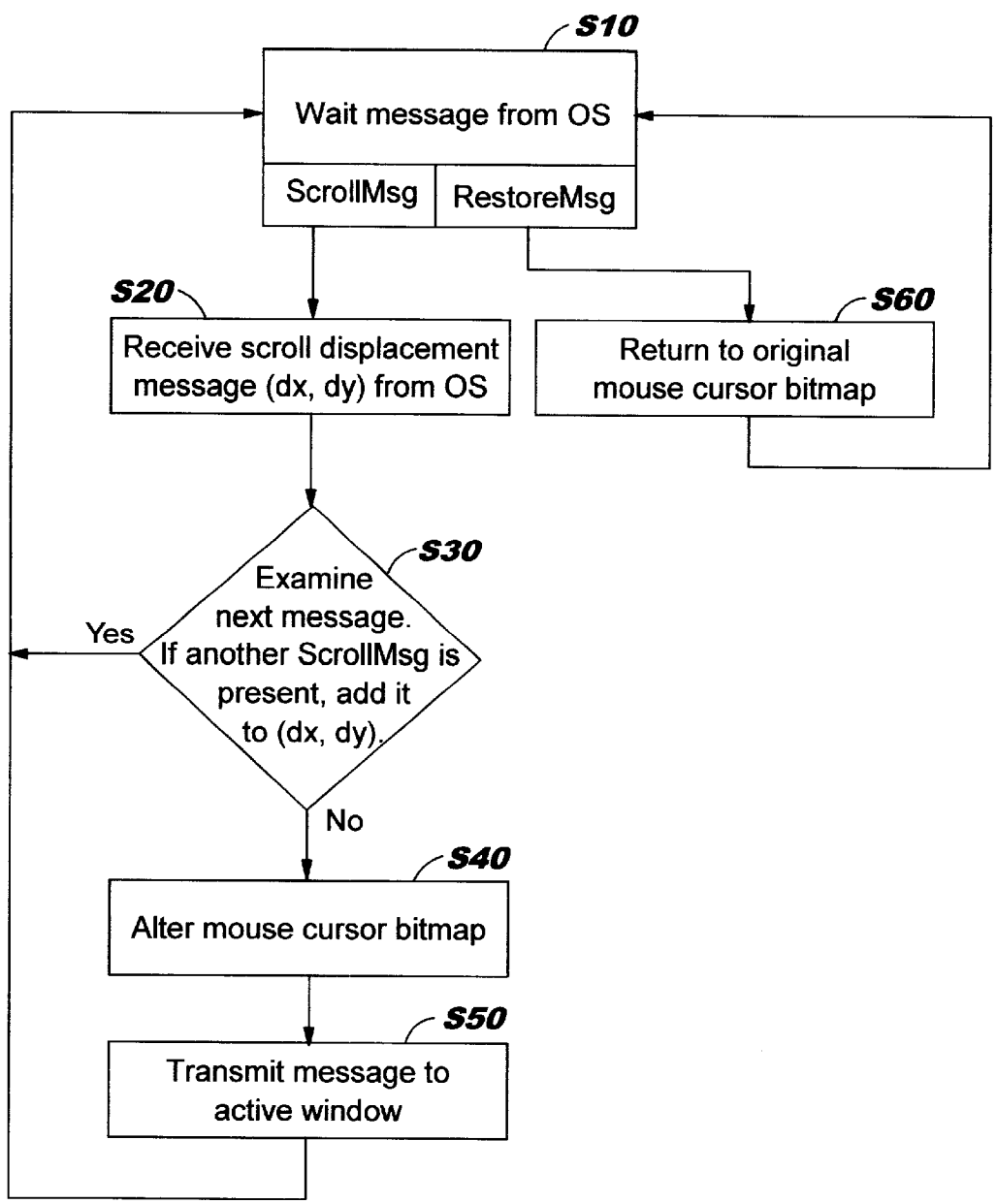
FIG. 4 is a flowchart showing the processing performed by a device driver for a mouse cursor display according to the present invention.

FIG. 4 is a flowchart showing the processing performed by device driver "Scroll Mapper" to display a mouse cursor in accordance with the present invention. The Scroll Mapper obtains the right of control of the PC system 100 upon the receipt of a message from the previously described queue of the OS, and interprets the activity to be performed. One of the messages dispatched to the Scroll Mapper is "ScrollMsg" (Step S10). ScrollMsg is issued when the mouse driver detects the clicking of the middle button of the mouse 200 (i.e, b2=1). The overall scrolling interval in this embodiment means the interval that is scrolled in response to a single scroll instruction, and is equal to the scrolling speed shown on the display screen (i.e., as viewed by a user). When ScrollMsg is received, the Scroll Mapper also receives coordinates (dx, dy) from the OS which represents a scrolling displacement message (Step S20).

Figure 5:
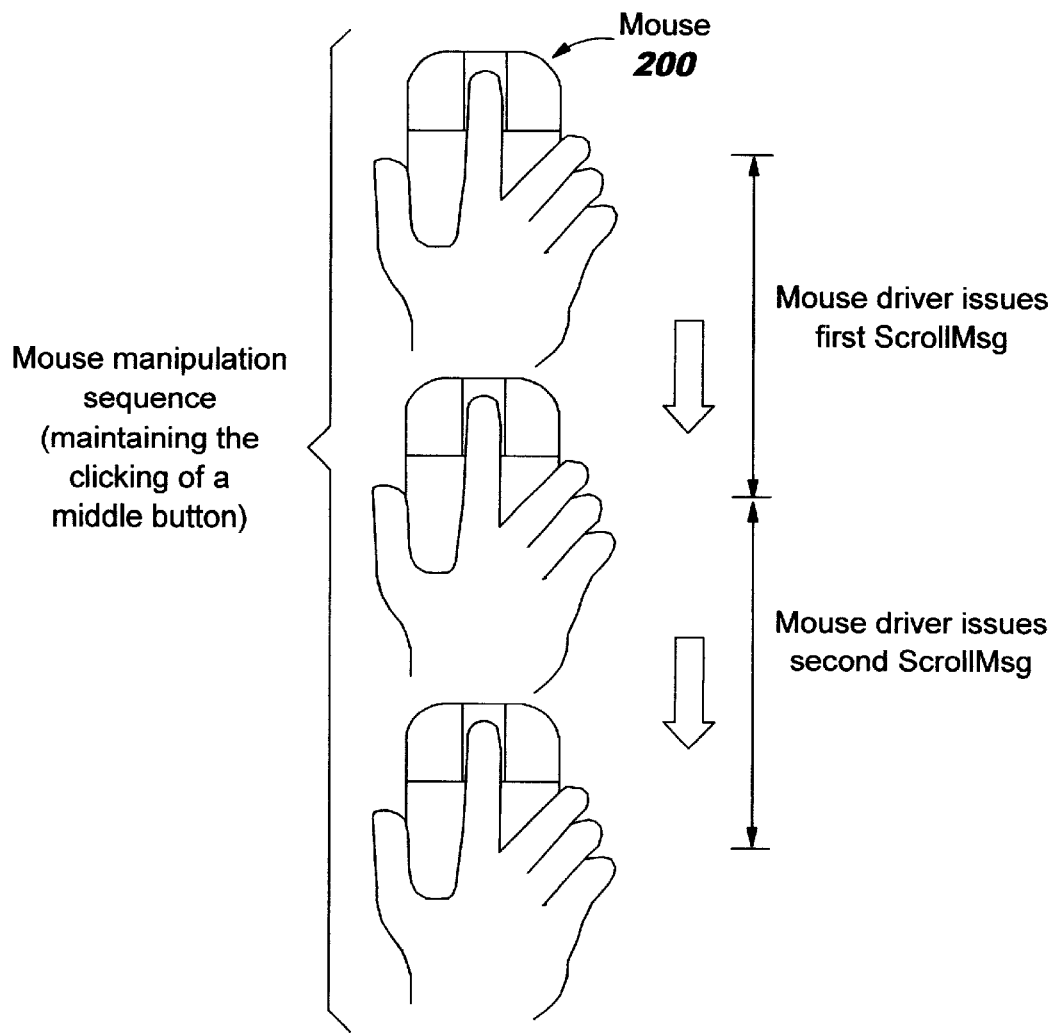
FIG. 5 is a diagram showing the state where one scroll instruction has been divided into two or more messages, depending on the timing of a user's manipulation of a mouse.
Figure 9:
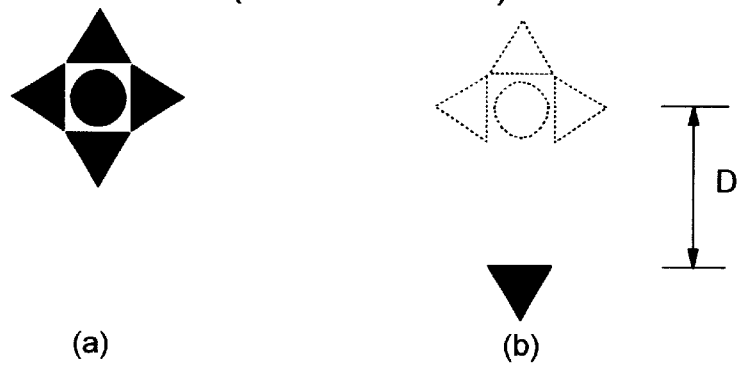
FIG. 9 is a schematic diagram showing the display during screen scrolling utilizing a mouse cursor installed for the IntelliMouse.

Then, messages in the queue of the OS are examined to determine whether there is still a message "ScrollMsg" for the Scroll Mapper. As previously described, the mouse 200 transmits a detected value to the KMC 27 at an interval of several tens of msec; however, one scrolling instruction may be divided into more than one scrolling message, depending on the timing of the user's mouse manipulation (see FIG. 5). Therefore, at step S30 the messages are examined and the scrolling intervals ($\Sigma dx$, $\Sigma dy$) accumulated in the queue are added together, and the resultant interval is defined as a single scrolling interval.

Assume that the mouse is manipulated to scroll data not only in either the x or the y direction, but simultaneously in the x and the y directions, i.e., that the mouse is manipulated so as to permit diagonal scrolling. Some applications, however, permit scrolling in only one direction, either horizontally or vertically, and inhibit simultaneous scrolling in two directions, i.e., the diagonal scrolling. In this case, the $\Sigma dx$ and $\Sigma dy$ acquired are compared with each other, and it may be assumed that scrolling is instructed in the direction having the larger value, while the smaller value is abandoned or ignored.

Based on the added overall scroll interval ($\Sigma dx$ or $\Sigma dy$), the bitmap display of the mouse cursor on the display screen is altered (Step S40). The alteration is performed, for example, in two stages. At the first stage, the normal mouse cursor display (FIG. 6($a$)) is changed to a mouse cursor display (FIG. 6($b$)) to indicate the scrolling. The mouse cursor in FIG. 6($b$) consists of a substantially circular mouse cursor body and four speed indicators located around and enclosing the cursor body, each representing one of the four directions (up, down, right, and left). The individual indicators are shaped like isosceles triangles, and their vertexes suggest the scrolling directions.

Figure 6:
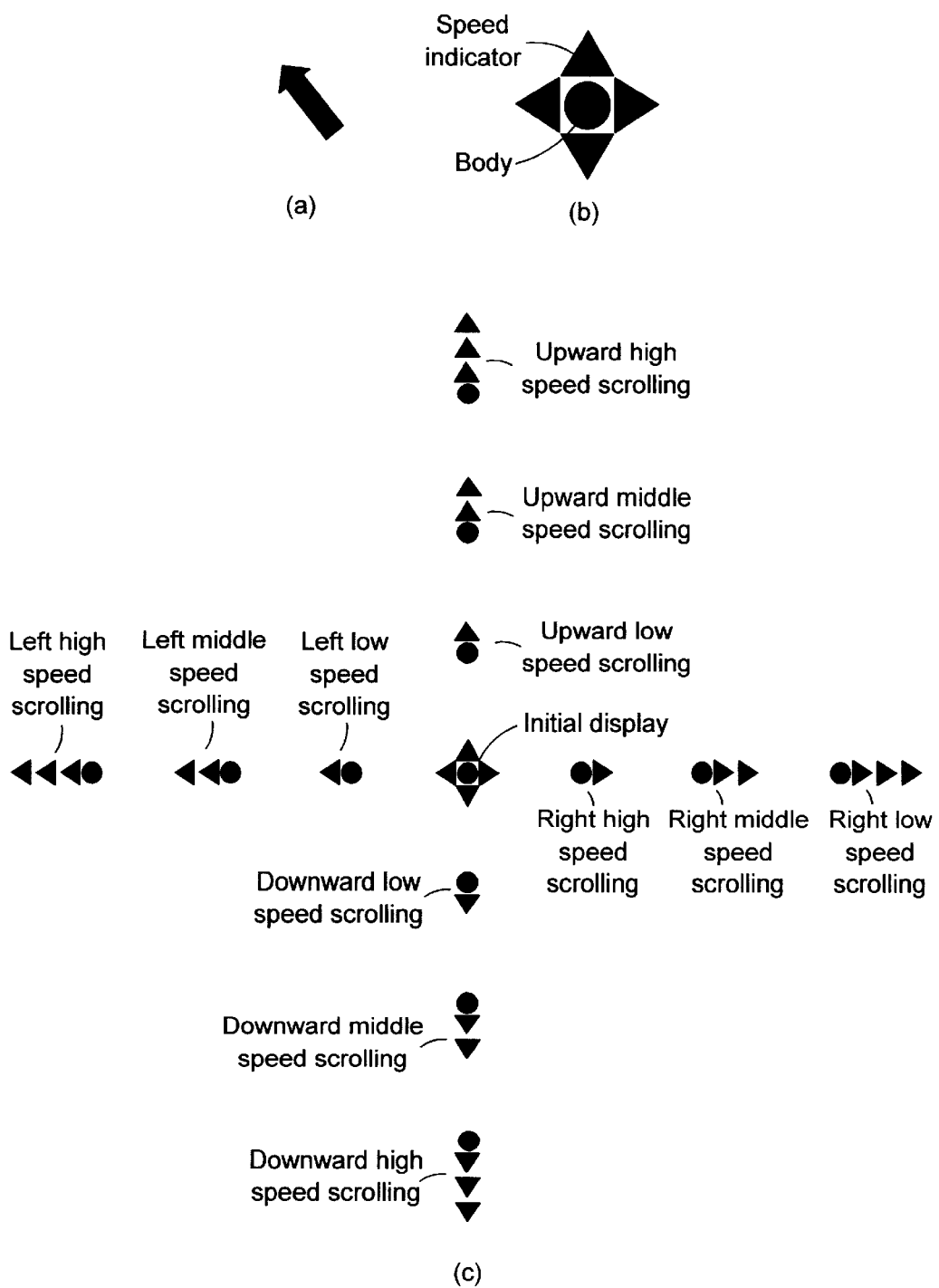
FIG. 6 is a diagram showing the bitmap images of mouse cursors before and after the bit mapped display is changed in accordance with the present invention.

The second stage for altering the mouse cursor involves the use of a quantity of speed indicators in the direction of scrolling, the quantity being based on the speed of the scrolling desired by the user as detected by the mouse 200. A number of speed indicators equivalent to the overall instructed scrolling interval are arranged in the scrolling direction. FIG. 6($c$) illustrates the state where the number of displayed speed indicators is changed step by step. That is, as the overall scroll interval increases and thus the scrolling speed increases from low to middle to high speed in the downward direction relative to the initial centrally located display in FIG. 6($c$), the number of speed indicators is increased to one, to two and to three. The speed indicators for the upward, the right direction, and the left direction disappear during the downward scrolling. The mouse cursor arrangement during upward, right, and left scrolling is also illustrated as shown in FIG. 6($c$). While, in FIG. 6($c$), for convenience sake, the mouse cursor arrangements for all four directions and three different speeds (or speed changes) are depicted, only the speed indicator corresponding to the current scrolling direction (and in a quantity corresponding to the scrolling speed) will actually appear on the desktop. The circular cursor body of the mouse cursor does not move from its initial position, regardless of the number of displayed speed indicators. Rather, the circular mouse cursor is displayed with the speed indicator in the scrolling direction and the speed indicators for the other directions are removed from the desktop.

Figure 7:
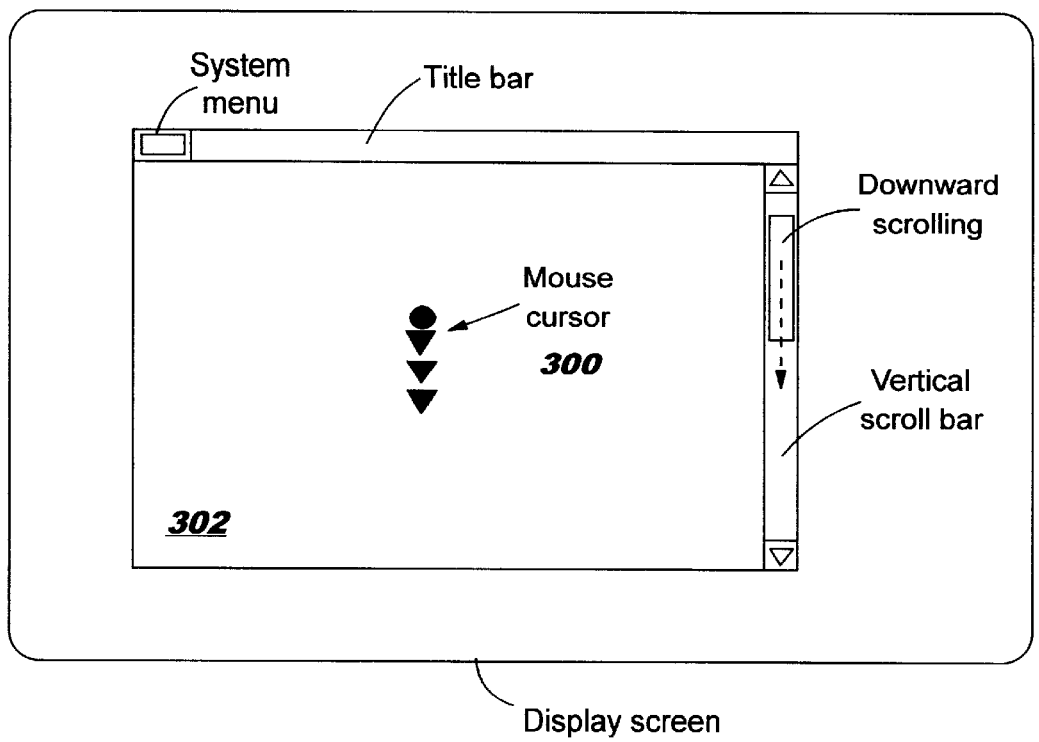
FIG. 7 is a diagram where the mouse cursor has been changed in accordance with the present invention to indicate fast downward scrolling of the data in a frame window.
Figure 8:
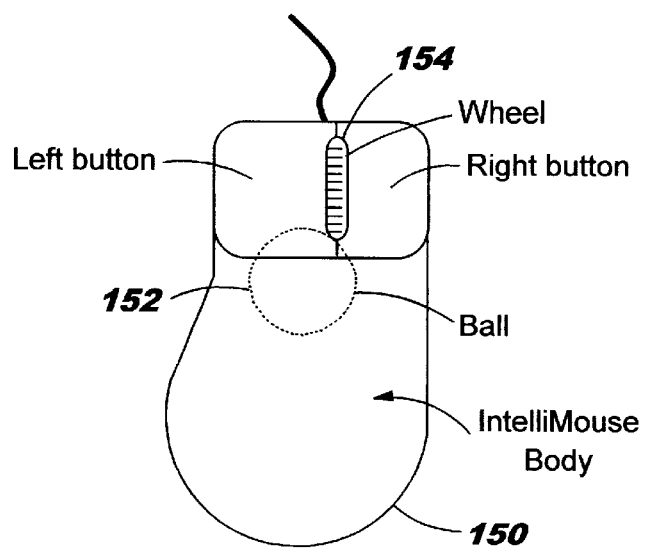
FIG. 8 is a diagram showing the outline of an IntelliMouse from Microsoft Corp.

FIG. 7 illustrates a mouse cursor 300 according to this embodiment displayed in a frame window 302. The displayed mouse cursor 300 indicates that fast downward scrolling of data is occurring in the frame window. The alteration of the mouse cursor does not necessarily need to be performed in two stages. The mouse cursors in FIG. 6($c$) are represented as a bitmap of 128×128 dots, and a corresponding bitmap may be temporarily pasted in that location.

When the bit mapped display of the mouse cursor has been changed, the Scroll Mapper then transmits to the active window message "ScrollMsg," which includes an instructed scrolling direction and an overall scrolling interval (Step S50). The Scroll Mapper thereafter returns to the OS message wait state (Step S10). The message "ScrollMsg," issued by the Scroll Mapper, is first inserted into the queue of the OS, and is then dispatched to the active window. Upon receipt of the message, the active application scrolls data displayed within the window.

Another message that may be dispatched to the Scroll Mapper is "RestoreMsg" (Step S10). "RestoreMsg" is issued when the middle button of the mouse 200 is released, i.e., when b2 is changed from 1 to 0. When the middle button of the mouse 200 is released, it means that the scrolling operation in the active window is terminated. In this case, the mouse cursor illustrated in FIG. 6(*b*), (*c*) or FIG. 7 must be returned to its original bit mapped display form. In the flowchart in FIG. 4, program control moves to step S60, where the bitmap of the mouse cursor is changed to that shown in FIG. 6(*a*). Then, program control returns to step S10 to wait for the next message from the OS.

As is described above, according to the present invention, is a superior information processing apparatus that can employ a pointing device to adjust the scrolling speed for data displayed in an application window is provided, which can indicate a scrolling speed visually so that a user can understand it easily.

The present invention has been described in detail while referring to a specific embodiment. However, it should be obvious to one having ordinary skill in the art that various modifications or revisions of the embodiment are possible within the scope of the present invention. In this embodiment, an explanation was given for a system based on a so called PC/AT compatible machine that conforms to the OADG specifications. However, the present invention can be accomplished in the same way by using another type of system (e.g., a system represented by the NEC PC 98 series or the Macintosh of Apple Computer Inc., or another machine that is compatible with either of these computers). That is, although the present invention has been disclosed by using the above example, the spirit and scope of the invention should not be limited to that example.

We claim:

1. An information processing apparatus having a mouse cursor display function, comprising:

a display unit for displaying data on a bit mapped display screen;

a pointing device for designating a coordinate location on said display screen, and for directing scrolling and setting a scrolling speed for data displayed on said display screen;

mouse cursor control means for displaying a mouse cursor at a coordinate location on said display screen designated by said pointing device;

scroll control means for scrolling the data on said display screen in accordance with a display data scrolling instruction from said pointing device; and scrolling speed display means for displaying a number of speed indicators during scrolling, the number of displayed speed indicators corresponding to a relative scrolling speed set by said pointing device while scrolling data on said display screen, and arranging the speed indicators in a scrolling direction relative to a center of said mouse cursor.

2. An information processing apparatus according to claim 1, further comprising means for changing a displayed image of the mouse cursor in response to whether a specific button of said pointing device is clicked or released.

3. In a computing environment, an enhanced mouse cursor for indicating a direction and a relative speed of scrolling of data displayed in a window on a display screen of an information processing apparatus that designates a coordinate location using a pointing device, said enhanced mouse cursor comprising:

a mouse cursor body located at the coordinate location designated by using said pointing device; and one or more speed indicators displayed in a number corresponding to a scrolling speed while scrolling data on said display screen, wherein said mouse cursor body does not move during scrolling, and the number of speed indicators displayed corresponds to a speed at which a user is moving the pointing device.

4. An enhanced mouse cursor according to claim 3, wherein the speed indicators are displayed relative to said mouse cursor body in a direction in which scrolling is occurring.

5. An enhanced mouse cursor according to claim 3, wherein said one or more speed indicators are arranged relative to a center of said mouse cursor in a scrolling direction.

6. An enhanced mouse cursor according to claim 3, wherein of said enhanced mouse cursor is displayed only during a data scrolling operation.

7. A control method for an information processing apparatus having a mouse cursor display function, said apparatus including a display unit for displaying data on a bit mapped display screen, and a pointing device for designating a coordinate location on said display screen and for directing scrolling and setting a scrolling speed of data displayed on said display screen, said control method comprising the steps of:

(a) displaying a mouse cursor at a coordinate location on said display screen designated by said pointing device;

(b) scrolling data on said display screen in accordance with a display data scrolling instruction from said pointing device; and (c) displaying speed indicators in a number corresponding to a scrolling speed set by said pointing device while scrolling data on said display screen, and displaying the speed indicators in a scrolling direction relative to a center of said mouse cursor.

8. Computer readable code stored on computer readable storage medium and executable by a computer system that includes a display unit for displaying data on a bit mapped display screen' and a pointing device for designating a coordinate location on said display screen and for directing scrolling and setting a scrolling speed for data displayed on said display screen, said code comprising:

(a) a routine for displaying a mouse cursor at a coordinate location on said display screen designated by said pointing device;

(b) a routine for scrolling data on said display screen in accordance with a display data scrolling instruction from said pointing device; and (c) a routine for modifying the mouse cursor to include speed indicators in a number which corresponds to a relative scrolling speed set by said pointing device while scrolling data on said display screen and displaying the speed indicators in a scrolling direction relative to a center of said mouse cursor.

* * * * *